(12) United States Patent
Patel et al.

(10) Patent No.: US 11,891,565 B1
(45) Date of Patent: Feb. 6, 2024

(54) HOST-GUEST LOST-CIRCULATION MATERIALS FOR SEALING LOST CIRCULATION ZONES IN WELLBORES

(71) Applicant: Saudi Arabian Oil Company, Dhahran (SA)

(72) Inventors: Hasmukh A. Patel, Katy, TX (US); Younane Abousleiman, Norman, OK (US); Ashok Santra, The Woodlands, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/819,419

(22) Filed: Aug. 12, 2022

(51) Int. Cl.
| | | |
|---|---|---|
| E21B 21/00 | (2006.01) | |
| C09K 8/035 | (2006.01) | |
| C09K 8/44 | (2006.01) | |
| C09K 8/487 | (2006.01) | |
| C09K 8/42 | (2006.01) | |

(52) U.S. Cl.
CPC .............. C09K 8/44 (2013.01); C09K 8/035 (2013.01); C09K 8/426 (2013.01); C09K 8/487 (2013.01); E21B 21/003 (2013.01)

(58) Field of Classification Search
None
See application file for complete search history.

(56) References Cited

U.S. PATENT DOCUMENTS

| | | | |
|---|---|---|---|
| 9,267,069 B2 | 2/2016 | Wagle et al. | |
| 2006/0096759 A1* | 5/2006 | Reddy | C09K 8/516 166/295 |
| 2013/0153223 A1* | 6/2013 | Muthusamy | C09K 8/467 106/804 |
| 2016/0362597 A1* | 12/2016 | Harris | C09K 8/528 |
| 2016/0369160 A1* | 12/2016 | Reddy | C09K 8/56 |
| 2020/0325070 A1* | 10/2020 | Patel | C04B 24/405 |
| 2021/0102112 A1* | 4/2021 | Patel | C04B 24/2611 |
| 2021/0130676 A1* | 5/2021 | Patel | C04B 24/2682 |

FOREIGN PATENT DOCUMENTS

| | | |
|---|---|---|
| CA | 2889139 C | 5/2014 |
| CN | 113831902 A | 12/2021 |

OTHER PUBLICATIONS

Mansour et al., "Smart Loss Circulation Materials for Drilling Highly Fractured Zones", Society of Petroleum Engineers, SPE/IADC-189413-MS, 9 pages, 2018.
Tang et al., "A review on the recent development of cyclodextrin-based materials usedin oilfield applications", Carbohydrate Polymers, vol. 240, 116321, 22 pages, 2020.

* cited by examiner

Primary Examiner — Andrew Sue-Ako
(74) Attorney, Agent, or Firm — DINSMORE & SHOHL LLP

(57) ABSTRACT

In accordance with one or more embodiments of the present disclosure, a host-guest lost circulation material (LCM) composition for sealing lost circulation zones in wellbores includes an aqueous solution; one or more linear polymer chains, the linear polymer chains comprising polyethylene glycols (PEG) with molecular weights greater than 2500 g/mol, polypropylene glycols (PPG), polydimethylsiloxanes (PDMS), or combinations thereof; and one or more cyclic molecules comprising alpha cyclodextrin, beta cyclodextrin, gamma cyclodextrin, or combinations thereof, and wherein the one or more cyclic molecules form a host-guest structure around the one or more linear polymer chains utilizing van der Waals forces.

20 Claims, 1 Drawing Sheet

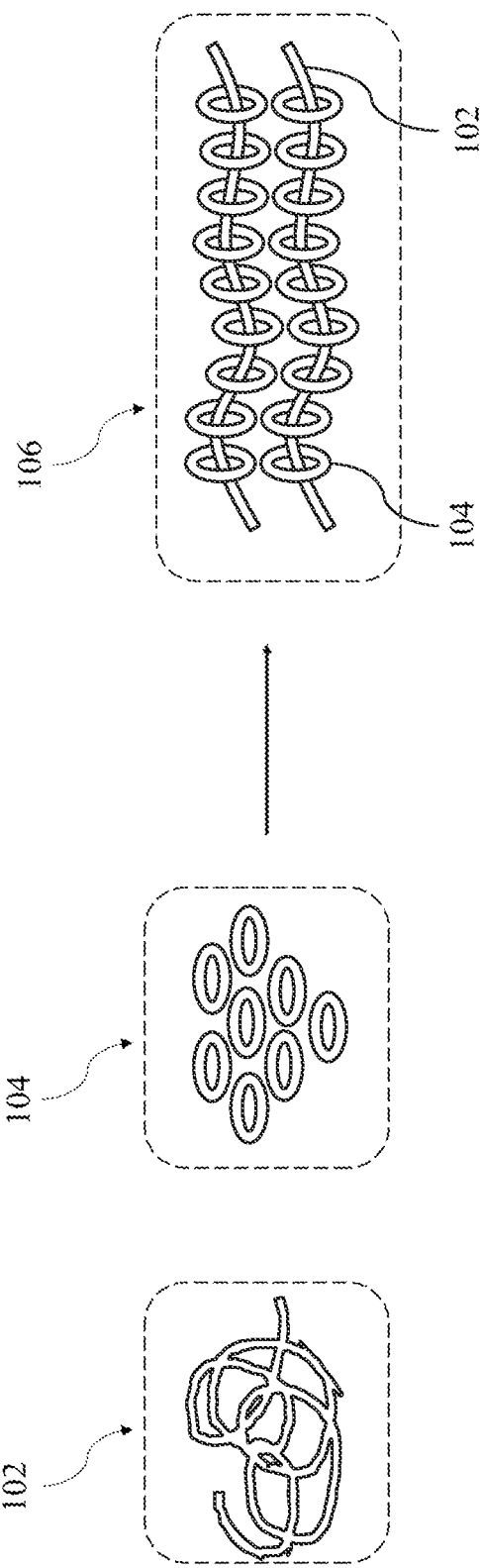

HOST-GUEST LOST-CIRCULATION MATERIALS FOR SEALING LOST CIRCULATION ZONES IN WELLBORES

TECHNICAL FIELD

Embodiments of the present disclosure generally relate to host-guest lost circulation materials and methods for sealing lost circulation zones in wellbores.

BACKGROUND

Extracting hydrocarbons from subterranean sources may require drilling a hole from the surface to the subterranean geological formation containing the hydrocarbons. Specialized drilling techniques and materials are utilized to form the wellbore hole and extract the hydrocarbons. Specialized materials utilized in drilling operations include drilling fluids and materials for sealing the casing-casing annulus of the wellbore, which may be formulated for specific downhole conditions. A wellbore is a hole that extends from the surface to a location below the surface to permit access to hydrocarbon-bearing subterranean formations. The wellbore can contain at least a portion of a fluid conduit that links the interior of the wellbore to the surface. The fluid conduit connecting the interior of the wellbore to the surface may be capable of permitting regulated fluid flow from the interior of the wellbore to the surface and may permit access between equipment on the surface and the interior of the wellbore. The fluid conduit may be defined by one or more tubular strings, such as casings, inserted into the wellbore and secured in the wellbore.

During drilling of a wellbore, cementing the wellbore, or both, lost circulation zones may be encountered which result in loss of drilling fluids, cementing compositions, or other fluids. In a lost circulation zone, the drilling fluids, cement compositions, or other fluids flow out of the wellbore and into the surrounding formation. Lost circulation zones may increase the cost of the well through increased material costs to replace lost fluids and downtime to remediate the lost circulation zone. Lost circulation zones may be remediated by introducing a lost circulation material into the lost circulation zone to seal off the lost circulation zone to prevent further fluid loss.

SUMMARY

An ongoing need exists for lost circulation materials for treating lost circulation zones encountered during resource well drilling. Traditional lost circulation materials can be categorized into different geometrical or qualitative description groups, e.g., granular, fibrous, flaky, granular, or a blend of the previous. Further, there are several types of commonly used LCM that are based on natural or synthetic materials. Particulate materials such as calcium carbon and graphite, fibrous materials such as wood fiber, mineral fiber, and glass fiber; flake materials such as cellophane, mica and vermiculite; and granular materials such as perilite, nut shells and ground tires are widely used. Finally, other types of materials including cement, cross-linked polymers and gels, viscoelastic surfactant, nanoparticles, foams, and shape memory polymers may also be used. These traditional LCMs are generally added to a drilling fluid or injected as a separate 'pill' or sweep.

However, these LCMs have a notable limitation in that the materials selected typically only fit into and plug moderate to large cracks and fractures leading to the lost-circulation zone. These materials may not adequately plug or bond to and cure against smaller cracks and fractures, (micrometer sized and below) which may lead to continued fluid loss to the lost-circulation zone. Therefore, a need exists for a LCM composition that can plug sub-micron cracks, and ideally a LCM composition that can form a LCM pack that plugs both the large moderate to large cracks and fractures as well as sub-micron sized ones.

Described herein are LCM compositions and methods for using the same that provide the aforementioned benefits. The LCM compositions include one or more cyclic molecules surrounding one or more linear polymer chains in a host-guest structure, suspended in an aqueous solution. The LCM compositions described herein can fit into and plug sub-micron fractures due to the nanometer dimensions of the individual host-guest structures. The LCM compositions can also be formulated to provide a LCM pack that can plug both large and sub-micron sized fractures by varying the chain lengths of the various linear chain polymers discussed herein. A LCM composition including both relatively shorter and longer chain length linear polymers in the host-guest structure can plug the sub-micron fractures with the smaller chain length linear polymers and the large fractures with the longer chain length linear polymers. The combination may result in a LCM pack that may considerably reduce filtration loss through the wellbore wall while drilling.

The LCM compositions can also provide added benefits due to the one or more cyclic molecules arranged around the one or more linear polymer chains. As previously mentioned, the one or more cyclic molecules may create a host-guest structure around the linear polymer chain, allowing the one or more cyclic molecules to slide around and across the chain. This flexibility may contribute to additional plugging of lost-circulation zone pores through the reorientation of the one or more cyclic molecules as well as adding to the stability of the wellbore itself, as these one or more cyclic molecules may slid around and across the chain to redistribute stresses along the face of the wellbore wall.

In accordance with one embodiment herein, a host-guest lost circulation material (LCM) composition for sealing lost circulation zones in wellbores includes an aqueous solution; one or more linear polymer chains, the linear polymer chains comprising polyethylene glycols (PEG) with molecular weights greater than 2500 g/mol, polypropylene glycols (PPG), polydimethylsiloxanes (PDMS), or combinations thereof; and one or more cyclic molecules comprising alpha cyclodextrin, beta cyclodextrin, gamma cyclodextrin, or combinations thereof, and wherein the one or more cyclic molecules form a host-guest structure around the one or more linear polymer chains utilizing van der Waals forces.

In accordance with another embodiment herein, a method of making a host-guest lost circulation material (LCM) composition for sealing lost circulation zones in wellbores includes adding one or more cyclic molecules to an aqueous solution, the cyclic molecules including alpha cyclodextrins, beta cyclodextrins, gamma cyclodextrins, or combinations thereof; adding one or more linear polymer chains to the aqueous solution, the linear polymer chains including polyethylene glycols (PEG) with molecular weights greater than 2500 g/mol, polypropylene glycols (PPG), polydimethylsiloxanes (PDMS), or combinations thereof; and agitating the aqueous solution until the aqueous solution is observed to turn opaque.

In accordance with another embodiment herein, a method of treating a lost circulation zone of a wellbore includes injecting a host-guest lost circulation material (LCM) composition into the lost circulation zone and allowing the LCM composition to plug the lost circulation zone, thereby preventing wellbore fluids from passing into the lost circulation zone. In the method, the LCM composition includes an aqueous solution; one or more linear polymer chains, the linear polymer chains comprising polydimethylsiloxanes (PDMS), polypropylene glycols (PPG), polyethylene glycols (PEG) with molecular weights greater than 2500 g/mol, or combinations thereof; and one or more cyclic molecules comprising alpha, beta, or gamma cyclodextrins, wherein the one or more cyclic molecules form a host-guest structure around the one or more linear polymer chains utilizing van der Waals forces;

Additional features and advantages of the embodiments described herein will be set forth in the detailed description which follows, and in part will be readily apparent to those skilled in the art from that description or recognized by practicing the embodiments described, including the detailed description and the claims which are provided infra.

BRIEF DESCRIPTION OF THE DRAWINGS

The following detailed description of specific embodiments of the present disclosure can be best understood when read in conjunction with the following drawings in which:

FIG. 1 illustrates a lost-circulation material according to embodiments herein.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Embodiments of the present disclosure are directed to host-guest lost circulation material (LCM) compositions for sealing lost-circulation zones in wellbores and subsurface formations, while providing the aforementioned benefits.

As used throughout this disclosure, the terms "downhole" and "uphole" may refer to a position within a wellbore relative to the surface, with uphole indicating direction or position closer to the surface and downhole referring to direction or position farther away from the surface.

As used throughout this disclosure, "host-guest structures" which are also generally referred to as "host-guest chemistries" refers to a branch of supramolecular chemistry in which a host molecule forms a chemical compound with a guest molecule or ion. The two components of the compound are held together by non-covalent forces, most commonly by hydrogen-bonding, van der Waals forces, and hydrophobic interactions. Binding between host and guest is usually highly specific to the two moieties concerned.

As used throughout this disclosure, the term "Newtonian viscosity" refers to the apparent viscosity of a fluid measured at a given rotor speed of a rotational viscometer. The Newtonian viscosity may be measured by multiplying the dial reading of the viscometer by 300, and dividing that product by the rotor speed in revolutions per minute.

As described in the present disclosure, a "subsurface formation" may refer to a body of rock that is sufficiently distinctive and continuous from the surrounding rock bodies that the body of the rock may be mapped as a distinct entity. A subsurface formation is, therefore, sufficiently homogenous to form a single identifiable unit containing similar properties throughout the subsurface formation, including, but not limited to, porosity and permeability.

As used throughout this disclosure, "wellbore," may refer to a drilled hole or borehole extending from the surface of the Earth down to the subsurface formation, including the openhole or uncased portion. The wellbore may form a pathway capable of permitting fluids to traverse between the surface and the subsurface formation. The wellbore may include at least a portion of a fluid conduit that links the interior of the wellbore to the surface. The fluid conduit connecting the interior of the wellbore to the surface may be capable of permitting regulated fluid flow from the interior of the wellbore to the surface and may permit access between equipment on the surface and the interior of the wellbore.

As used throughout this disclosure, a "wellbore wall" may refer to the interface through which fluid may transition between the subsurface formation and the interior of the wellbore. The wellbore wall may be unlined (that is, bare rock or formation) to permit such interaction with the subsurface formation or lined, such as by a tubular string, so as to prevent such interactions. The wellbore wall may also define the void volume of the wellbore.

As previously stated, the present disclosure is directed to compositions for a host-guest LCM for sealing lost circulation zones in wellbores. Initially referring to FIG. 1, the LCM composition includes an aqueous solution, one or more linear polymer chains 102, and one or more cyclic molecules 104, wherein the one or more cyclic molecules 104 form a host-guest structure 106 around the one or more linear polymer chains 104 utilizing van der Waals forces. The one or more linear polymer chains include polyethylene glycols (PEG) polypropylene glycols (PPG), polydimethylsiloxanes (PDMS), or combinations thereof. In embodiments, ethylene glycol, propylene glycol, and dimethylsiloxane may have molecular weights of approximately 43.14 g/mol, 56.82 g/mol, and 74.62 g/mol, respectively. The one or more linear polymer chains may include repeating units of ethylene glycols, propylene glycols, dimethylsiloxanes, or combinations thereof. The one or more cyclic molecules include alpha ($\alpha$) cyclodextrin, beta ($\beta$) cyclodextrin, gamma ($\gamma$) cyclodextrin, or combinations thereof.

In embodiments, the one or more linear polymer chains may have a molecular weight from 500 g/mol to 75,000 g/mol. The molecular weight of the entire chain may be expressed as the individual molecular weight of the polymer, for example ethylene glycol, multiplied by the number of repeating units of the chain, or generally through gel permeation chromatography. The one or more linear polymer chains, in particular linear polymer chains including PDMS, PPG, and PEG respectively, may have any of the molecular weights disclosed in Table 1 below, as well as embracing any of the ranges between the molecular weights in Table 1 below. The molecular weight of the linear polymer chain may also correspond to the chain length of the linear polymer chain. In embodiments, the one or more linear polymer chains may have a chain length, or "polymer length," of from 1 nm to 500 nm. That is, the linear polymer chain may be made up of the repeating units of the polymer amounting to a chain length of a given length. For example, 1 nm in chain length may correspond to 500 g/mol PDMS. In another example, 500 nm in chain length may correspond to 75,000 g/mol PEG. The one or more linear polymer chains, in particular PDMS, PPG, and PEG respectively, may have any of the molecular weights disclosed in Table 1 below, as well as embracing any of the ranges between the lengths in Table 1 below. For example, and in embodiments, PEG may have a molecular weight of 2500 g/mol to 3000 g/mol, or a molecular weight of from 2500 g/mol to 50,000 g/mol, as well as any of the ranges therein.

TABLE 1

Linear Polymer Molecular Weight vs. Approximate Polymer Length

| PDMS, Molecular Weight (g/mol) | Approximate Polymer Length, nm | PPG, Molecular Weight (g/mol) | Approximate Polymer Length, nm | PEG, Molecular Weight (g/mol) | Approximate Polymer Length, nm |
|---|---|---|---|---|---|
| 50000 | 100 | 50000 | 256 | 50000 | 337 |
| 45000 | 90 | 45000 | 230 | 45000 | 304 |
| 40000 | 80 | 40000 | 205 | 40000 | 270 |
| 35000 | 70 | 35000 | 179 | 35000 | 236 |
| 30000 | 60 | 30000 | 153 | 30000 | 202 |
| 25000 | 50 | 25000 | 128 | 25000 | 169 |
| 20000 | 40 | 20000 | 102 | 20000 | 135 |
| 15000 | 30 | 15000 | 77 | 15000 | 101 |
| 10000 | 20 | 10000 | 51 | 10000 | 67 |
| 5000 | 10 | 5000 | 26 | 5000 | 34 |
| 4000 | 8 | 4000 | 20 | 4000 | 27 |
| 3000 | 6 | 3000 | 15 | 3000 | 20 |
| 2500 | 5 | 2500 | 12.5 | 2500 | 16.5 |
| 1000 | 2 | 1000 | 5 | 1000 | 7 |

As previously discussed, the one or more cyclic molecules 104 form a host-guest structure 106 around the one or more linear polymer chains. As discussed more herein, the one or more cyclic molecules may have an internal diameter, which may also be referred to as a "torus" or "cavity" with a cavity height. The internal diameter or cavity height of the one or more cyclic molecules may generally be understood to be approximately 1 nm, or more specifically 0.8 nm. Accordingly, the linear polymer chains are required to be at least greater than 1 nm in length so as to allow multiple cyclic molecules to attach along the chain.

In embodiments, the one or more linear polymer chains may also include branched linear polymer chains. The one or more linear polymer chains may include one or more reactive end groups. The reactive end groups may include amines, carboxylates, hydroxyls, or combinations thereof. However, the reactive end groups may also include thiols, esters, azides, epoxides, nitro groups, or combinations thereof. Reactive end groups including amines, carboxylates, or hydroxyls may provide additional benefits due to the added stability of these chemical groups over the other previously listed reactive end groups. Further, hydroxyl terminated end groups may provide further yet benefits due to the favorable threading of the cyclic molecules over the hydroxyl groups.

In embodiments, the polyethylene glycols' may have a structure having Formula (I):

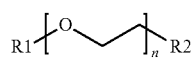

(I)

In Formula (I), "R1" and "R2" may be reactive end groups, including any of the reactive end groups previously mentioned. Also in Formula (I), "n" may be an integer from 10 to 1000. As used herein, "n" may also be referred to as the number of repeating units of polymer within the linear polymer chain. This may allow the polyethylene glycol to have a variable chain length, which may also allow variable amounts of loading of the one or more cyclic molecules onto or around a repeating linear polymer chain of polyethylene glycol. In one embodiment, the PEG may have 567 repeating units as the linear polymer chain.

In embodiments, the polypropylene glycols' may have a structure having Formula (II):

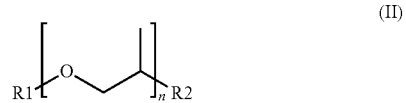

(II)

In Formula (II), "R1" and "R2" may be reactive end groups, including any of the reactive end groups previously mentioned. Also in Formula (II), "n" may be an integer from 10 to 1000. As used herein, "n" may also be referred to as the number of repeating units of polymer within the linear polymer chain. This may allow the polypropylene glycol to have a variable chain length, which may also allow variable amounts of loading of the one or more cyclic molecules onto or around a repeating linear polymer chain of polypropylene glycol. In one embodiment, the PPG may have 430 repeating units as the linear polymer chain.

In embodiments, the polydimethylsiloxanes' may have a structure having Formula (III):

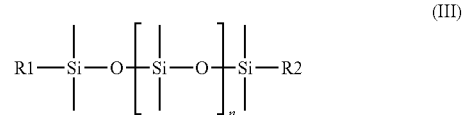

(III)

In Formula (III), "R1" and "R2" may be reactive end groups, including any of the reactive end groups previously mentioned. Also in Formula (III), "n" may be an integer from 10 to 1000. As used herein, "n" may also be referred to as the number of repeating units of polymer within the linear polymer chain. This may allow the polydimethylsiloxanes to have a variable chain length, which may also allow variable amounts of loading of the one or more cyclic molecules onto or around a repeating linear polymer chain of polydimethylsiloxanes. In one embodiment, the PDMS may have 335 repeating units as the linear polymer chain.

In embodiments, the variable loading of the one or more cyclic molecules around the one or more linear polymer chains may affect the rigidity of the host-guest cyclic molecule-linear polymer chain structure. For example, the loading of the linear polymer chain with an amount of cyclic molecules approaching the maximum loading may create a rigid rod-like host-guest structure. In embodiments, more rigid host-guest structures may contribute to a stronger LCM pack against the wellbore wall, i.e. the LCM pack may contribute to the stability of the wellbore against collapse or sloughing. In another example, the loading of the linear polymer chain with an amount of cyclic molecules approaching the minimal loading, such as from 1% to 20%, may create a flexible rod-like host-guest structure. In embodiments, more flexible rod-like structures may contribute to a LCM pack that can slide and shapeshift to more completely fill lost-circulation zones, substantially reducing filtrate loss to the lost-circulation zone. In embodiments, the amount of cyclic molecule loading to contribute to a rigid rod-like structure may vary for the linear polymer chain cyclic molecule combination chosen. For example, and in embodiments, cyclic molecule loading of greater than 60% may cause a rigid structure in PPG and PDMS containing LCM compositions. In contrast, cyclic molecule loading of greater than 75% may be necessary to have a rigid structure in PEG containing LCM compositions. Further, and in embodiments, the side chain groups (methyl in polypropylene and dimethyl in PDMS may provide additional rigidity to the linear polymer chains.

As previously mentioned, the LCM composition includes one or more cyclic molecules including alpha (α) cyclodextrin, beta (β) cyclodextrin, gamma (γ) cyclodextrin, or combinations thereof. The alpha (α) cyclodextrins, beta (β) cyclodextrins, and gamma (γ) cyclodextrins may have chemical structures of $C_{36}H_{60}O_{30}$, $C_{42}H_{70}O_{35}$, and $C_{49}H_{80}O_{40}$ respectively. The alpha, beta, and gamma cyclodextrins may generally be structured in a frusto-conical shape, with hydrophilic and hydrophobic ends as well as a smaller similar frusto-conical opening within. As used immediately previous, "similar" refers to the geometric definition for similarity, i.e., two objects having the same shape if the other object is rescaled, repositioned, and/or reflected, so as to coincide precisely with the other object.

In embodiments, when the one or more linear polymer chains 102 are exposed to the one or more cyclic molecules 104 in the aqueous solution, the two may form a host-guest structure 106, with the one or more cyclic molecules acting as the host and the one or more linear polymer chains acting as the guest. As is illustrated in FIG. 1, the two may also self-assemble as a rod-like structure, with the one or more linear polymer chains 102 'threading' through the center of the one or more cyclic molecules 104. The linear polymer chain may then be held in place by the one or more cyclic molecules 104 due to weak electrostatic charges such as van der Waal forces. The one or more cyclic molecules 104 may also be flexibly free to slide along or rotate around the linear polymer chain. In embodiments, this flexibility may contribute to additional plugging of lost-circulation zone pores through the reorientation of the one or more cyclic molecules as well as adding to the stability of the wellbore itself, as these one or more cyclic molecules may slide around and across the linear polymer chain 102 to redistribute stresses along the face of the wellbore wall.

In embodiments, the one or more cyclic molecules may self-select the one or more linear polymer chains for the host-guest structures. For example, the alpha, beta, and gamma cyclodextrins may all have different dimensions that may only allow certain linear polymer chains to be contained as the guest within the host-guest structure. These different dimensions are illustrated below in Table 2. Alpha cyclodextrin is the smallest of the cyclodextrins, and so may be the most selective in terms of the one or more linear polymer chains. In embodiments, alpha cyclodextrin may create host-guest structures with polyethylene glycols. Beta cyclodextrin is the next smallest cyclodextrin, and so may be the next most selective in terms of the one or more linear polymer chains. In embodiments, beta cyclodextrin may create host-guest structures with polyethylene glycols and polypropylene glycols. Gamma cyclodextrin is the largest of the cyclodextrins, and so may be the least selective in terms of the one or more linear polymer chains. In embodiments, gamma cyclodextrin may create host-guest structures with polydimethylsiloxanes, polypropylene glycols, and polyethylene glycols.

TABLE 2

Dimensions and Molecular Weights of Cyclodextrins

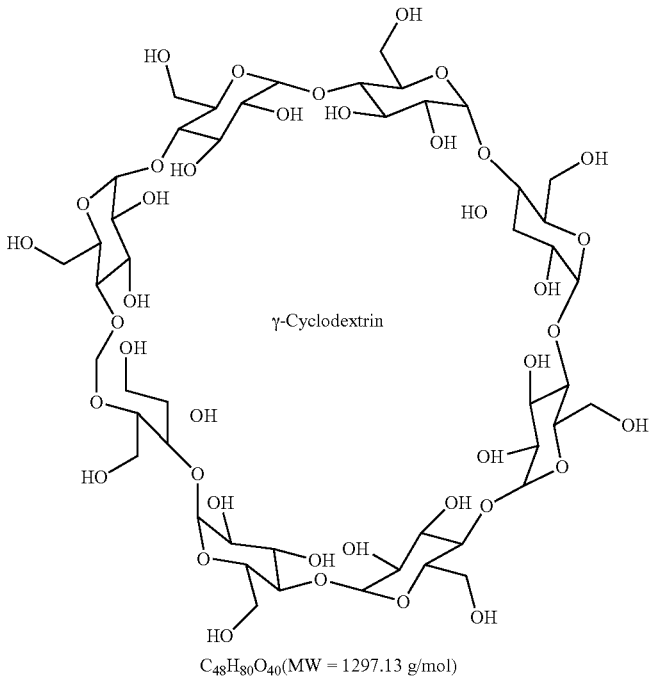

γ-Cyclodextrin $C_{48}H_{80}O_{40}$ (MW = 1297.13 g/mol)

TABLE 2-continued

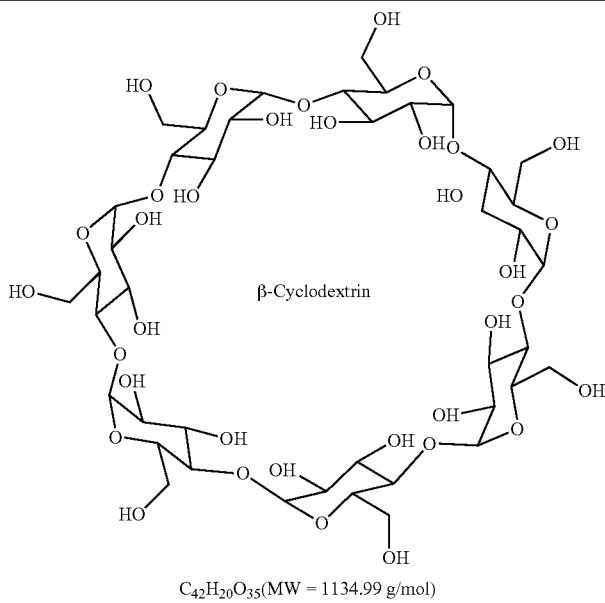

β-Cyclodextrin $C_{42}H_{20}O_{35}$ (MW = 1134.99 g/mol)

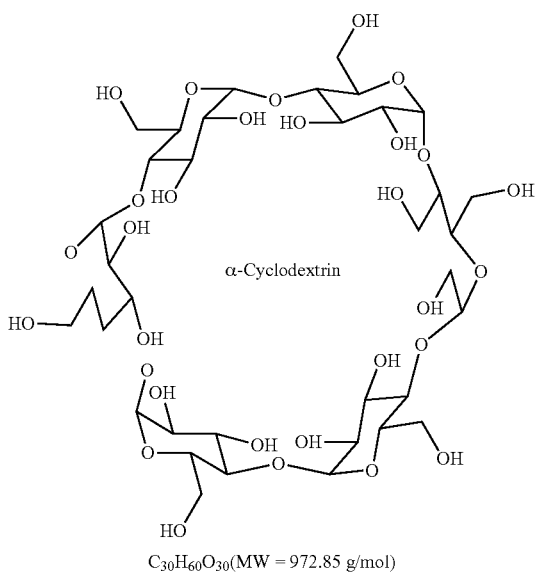 [SMILES: OCCCC(O)C(O)C(O)OC1C(CO)OC(OC2C(CO)OC(OC(CO)C(CO)OC(CO)OC3C(CO)OC(OC4C(CO)OC(O)C(O)C4O)C(O)C3O)C(O)C2O)C(O)C1O]

α-Cyclodextrin $C_{30}H_{60}O_{30}$ (MW = 972.85 g/mol)

| | γ-Cyclodextrin | β-Cyclodextrin | α-Cyclodextrin |
|---|---|---|---|
| Inner diameter, nm | 0.75-0.83 | 0.6-0.65 | 0.47-0.53 |
| External diameter, nm | 1.75 | 1.54 | 1.46 |
| Cavity height, nm | 0.79 | 0.79 | 0.79 |
| Cavity volume, nm | 42.7 | 26.2 | 17.4 |

In embodiments and as illustrated in FIG. 1, the linear polymer chain 102 may have multiple cyclic molecules 104 as a host-guest structure 106 along the chain. The chain length of the linear polymer chain 102 may also affect how many cyclic molecules 104 may be present along the chain as the host-guest structure 106. As chain length increases, the ratio of the one or more cyclic molecules to the one or more linear polymer chains may also increase. In embodiments, the ratio of one or more cyclic molecules to one or more linear polymer chain may be from 5:1 to 879:1 cyclic molecules to linear polymer chain. For example, a PDMS linear polymer chain of length 50 nm may have a cyclic polymer loading of up to 25 cyclic molecules along the linear polymer chain. Different maximum cyclic polymer loadings for different linear polymer chain lengths are illustrated below in Table 3. As previously discussed, the one or more linear polymer chains may be variably loaded with different amounts of the one or more cyclic molecules. Accordingly, Table 3 below is meant to embrace any of the ranges of the one or more cyclic molecules illustrated within. For example, a PDMS linear polymer chain with length 100 nm is meant to embrace both a loading range of 1 to 50 cyclic molecules to linear polymer chain, as well as 20 to 50 cyclic molecules to linear polymer chain, and so on.

TABLE 3

| Length PDMS, nm | Maximum cyclic molecule loading for chain length | Length PPG, nm | Maximum cyclic molecule loading for chain length | Length PEG, nm | Maximum cyclic molecule loading for chain length |
|---|---|---|---|---|---|
| 100 | 50 | 256 | 128 | 337 | 168 |
| 90 | 15 | 230 | 115 | 304 | 152 |
| 80 | 10 | 205 | 102 | 270 | 135 |
| 70 | 35 | 179 | 89 | 236 | 118 |
| 60 | 30 | 153 | 76 | 202 | 101 |
| 50 | 25 | 128 | 64 | 169 | 84 |
| 40 | 20 | 102 | 51 | 135 | 67 |
| 30 | 15 | 77 | 38 | 101 | 50 |
| 20 | 10 | 51 | 25 | 67 | 33 |
| 10 | 5 | 26 | 13 | 34 | 17 |
| 8 | 4 | 20 | 10 | 27 | 13 |
| 6 | 3 | 15 | 2 | 20 | 10 |
| 4 | 2 | 10 | 5 | 13 | 6 |
| 2 | 1 | 5 | 2 | 7 | 3 |

In embodiments, the LCM composition may include 567 repeating units (n) of PEG as the one or more linear chain polymers with alpha cyclodextrin as the one or more cyclic molecules. The alpha cyclodextrin may form a host-guest structure around the PPG utilizing van der Waals forces. In embodiments, the LCM composition may include 430 repeating units (n) of PPG as the one or more linear chain polymers with beta cyclodextrin as the one or more cyclic molecules. The beta cyclodextrin may form a host-guest structure around the PPG utilizing van der Waals forces. In embodiments, the LCM composition may include 335 repeating units (n) of PDMS as the one or more linear chain polymers with gamma cyclodextrin as the one or more cyclic molecules. The gamma cyclodextrin may form a host-guest structure around the PDMS utilizing van der Waals forces.

As previously mentioned, the LCM composition includes an aqueous solution. The one or more cyclic molecules and the one or more linear polymer chains may be suspended in the aqueous solution. In embodiments, suspending the previous in the aqueous solution may increase the plastic viscosity of the aqueous solution. The plastic viscosity of the aqueous solution with the one or more linear polymer chains and the one or more cyclic molecules may be from 5 centiPoise (cP) to 50 cP, from 5 to 30 cP, from 5 to 20 cP, from 5 to 15 cP, from 5 to 10 cP, from 10 cP to 50 cP, from 10 to 30 cP, from 10 to 20 cP, from 10 to 15 cP, from 15 cP to 50 cP, from 15 to 30 cP, from 15 to 20 cP, from 20 cP to 50 cP, from 20 to 30 cP, or from 30 to 50 cP at 20° C.

In embodiments, the rheology of a fluid used in subsurface oil and gas operation may be characterized by the plastic viscosity (PV) in centiPoise (cP) and the yield point (YP), which are parameters from the Bingham plastic rheology model. The PV is related to the resistance of the fluid to flow and may be due to mechanical interaction between solids of the fluid. PV may also represent the viscosity of the fluid extrapolated to infinite shear rate. The PV may also reflect the type and concentration of the solids that may be in the fluid. The PV of a fluid may be estimated by measuring the shear stress of the fluid using, for example, a controlled temperature and pressure rotational viscometer, such as a Fann Model 35A, commercially available from Fann Instruments (Houston, Tex.), at spindle speeds of 300 rotations per minute (RPM) and 600 RPM and subtracting the 300 RPM dial reading from the 600 RPM dial reading according to Equation 1:

Equation 1 PV (cP)=(dial reading at 600 RPM)−(dial reading at 300 RPM)

In embodiments, the LCM composition may behave as a rigid body when the shear stress is less than the YP, and the LCM composition may flow as a viscous fluid when the shear stress is greater than the YP. In other words, the YP may represent the amount of stress required to move the LCM composition from a static condition. The YP is expressed as a force per area, such as pounds of force per one hundred square feet (1 $b_f/100$ $ft^2$), for example. In embodiments, the YP may provide an indication of the ability of the LCM to provide the added benefit of carrying drill bit cuttings away from the drill bit, which in simplified terms may give an indication of the LCM's hole-cleaning ability. The YP is determined by extrapolating the Bingham plastic rheology model to a shear rate of zero. The YP may also be estimated from the PV (as measured in accordance with Equation 1, as previously described) according to Equation 2:

Equation 2 YP=(dial reading at 300 RPM)−PV

In embodiments, the aqueous solution may include water. The water may be distilled water, deionized water, or tap water. In embodiments, the water may contain additives or contaminants. For instance, the water may include freshwater or seawater, natural or synthetic brine, formation water, or salt water. In embodiments, salt or other organic compounds may be incorporated into the water to control certain properties of the water, and thus the wellbore fluid, such as density. Without being bound by any particular theory, increasing the saturation of water by increasing the salt concentration or the level of other organic compounds in the water may increase the density of the water, and thus, the wellbore fluid. In embodiments, suitable salts may include, but are not limited to, alkali metal chlorides, hydroxides, or carboxylates. Suitable salts may also include sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides, or combinations thereof.

In embodiments, the one or more linear polymer chains and the one or more cyclic molecules combined may make up from 1 wt.% to 25 wt.% of the LCM composition. The one or more linear polymer chains and the one or more cyclic molecules may make up from 1 wt.% to 25 wt.%, from 1 to 20 wt.%, from 1 to 15 wt.%, from 1 to 10 wt.%, from 1 to 5 wt.%, from 1 to 3 wt.%, from 3 to 25 wt.%, from 3 to 20 wt.%, from 3 to 15 wt.%, from 3 to 10 wt.%, from 3 to 5 wt.%, from 5 to 25 wt.%, from 5 to 20 wt.%, from 5 to 15 wt.%, from 5 to 10 wt.%, from 10 to 25 wt.%, from 10 to 20 wt.%, from 10 to 15 wt.%, from 15 to 25 wt.%, from 15 to 20 wt.%, or from 20 to 25 wt.% of the LCM composition.

Embodiments herein may also include aqueous-based drilling fluids incorporating the LCM composition. The aqueous-based drilling fluids may include any of the LCM compositions discussed herein, as well as a viscosifier and a weighting agent. The viscosifier may include xanthan gum, guar, glycol, carboxymethylcellulose, polyanionic cellulose, or combinations thereof. The weighting agent may include bentonite, barite (barium sulfate), calcium carbonate, hematite, or combinations thereof. The aqueous-based drilling fluid may also include any other commercially-known additives known to be beneficial to drilling operations, including but not limited to: deflocculants, clay inhibitors, scavengers, corrosion inhibitors, biocides, friction reducers, surfactants, or combinations thereof. In embodiments, the aqueous-based drilling fluid may include from 1 wt.% to 25 wt.% LCM composition, measured by weight of the aqueous-based drilling fluid.

Embodiments herein may also include methods of making the LCM composition. The method of making the LCM composition for sealing lost circulation zones in wellbores may include adding one or more of the cyclic molecules to the aqueous solution, adding one or more linear polymer chains to the aqueous solution, and mixing or agitating the aqueous solution until the aqueous solution is observed to turn opaque.

The LCM compositions may also be used in a method of treating a lost circulation zone of a wellbore. The LCM compositions used may include any of the LCM compositions previously or hereinafter described. A method of treating a lost circulation zone of a wellbore with the LCM composition may include injecting the LCM composition into the lost circulation zone. The method may further include allowing the LCM composition to plug the lost circulation zone, thereby preventing wellbore fluids from passing into the lost circulation zone. The method may also include introducing a displacement fluid after the LCM composition to displace the LCM composition into the lost circulation zone.

In embodiments, the lost circulation zone may include pore sizes of various size, the pore sizes ranging from sub-micron (nanometer) diameters to thousands of microns (millimeters). Determinations of lost circulation zone pore size may be made for example by taking a core sample of the lost-circulation zone of the wellbore, or of another previously drilled wellbore with similar geological characteristics, and conducting an accessible pore size analysis.

In one embodiment, the LCM composition may be injected into a lost circulation zone including pore sizes of less than one micron, for example from 1 nm to 1 micrometer. In these embodiments, the LCM composition may be formulated or chosen to only include linear polymer chains with chains lengths less than the greatest pore diameter. In the above lost-circulation zone, LCM compositions could be selected with chain lengths of less than 1 micrometer (1000 nanometers). This may allow the LCM composition to plug the submicron pores of the lost-circulation zone. Additionally, for lost-circulation zones greater than 1 micron in pore size, the LCM composition may be formulated to have a wide range of linear polymer chain lengths (from 1 nm to 500 nm in length). This may allow the LCM composition to plug both the greater than 1 micron lost-circulation zone pores as well as the sub-micron size pores. This may allow for a LCM pack on the lost-circulation zone that contributes to substantial reduction in filtration loss.

In embodiments, the LCM composition may allow for filtration loss reductions of from 1 mL to 45 mL, from 1 to 35 mL, from 1 to 15 mL, from 1 to 10 mL, from 1 to 5 mL, from 5 mL to 45 mL, from 5 to 35 mL, from 5 to 15 mL, from 5 to 10 mL, from 10 mL to 45 mL, from 10 to 35 mL, from 10 to 15 mL, from 15 mL to 45 mL, from 15 to 35 mL, or from 35 to 45 mL fluid loss per 31.65 to 62.21 cm² of lost circulation zone surface area on the wellbore wall.

In embodiments, the LCM composition may allow for filtration loss reductions of from 50% to 100% to the lost-circulation zone. In embodiments, the LCM composition may allow for filtration loss reductions of from 50% to 100%, from 50 to 90%, from 50 to 75%, from 50 to 60%, from 60% to 100%, from 60 to 90%, from 60 to 75%, from 75% to 100%, from 75 to 90%, or from 90 to 100% to the lost-circulation zone.

In embodiments, the LCM compositions can also provide the added benefit of stabilizing wellbores. Treatment of wellbore walls including the lost-circulation zone can operate to reinforce the wellbore wall, and reduce the probability of negative events such as formation sloughing (sluff) or wellbore collapse. As previously mentioned, the one or more cyclic molecules may flexibly slide around and across the chain. This flexibility may allow the one or more cyclic molecules to rearrange themselves around and across the linear polymer chain to more evenly distribute forces and pressures within the lost-circulation zone and wellbore wall. This may contribute to added stability that may reduce the chance of a wellbore collapse.

EXAMPLES

Example 1: Method of preparing host-guest LCM composition

A LCM composition, according to embodiments herein, was prepared in the following manner. 15 grams of gamma cyclodextrin, commercially available from CycloLab, Hungary as Cyclomaltooctaose, was added and dissolved in a 25° C. aqueous solution of 300 milliliters of de-ionized water. 30 grams of aminopropyl terminated polydimethylsiloxane, commercially available from Gelest, U.S.A. as aminopropyl terminated polydimethylsiloxane was then added into the aqueous solution under vigorous stirring for five hours. The resulting aqueous solution was an opaque milky-white suspension of the host-guest gamma cyclodextrin-polydimethylsiloxane structure.

Example 2: Filtration loss testing of host-guest LCM compositions.

A filtration loss experiment was also conducted using the LCM compositions. For these tests, a 300 API low temperature low pressure filter press with a filter paper to simulate conductive pore space that may be encountered in a lost-circulation zone. The diameters of the pore throats of the paper filter varied between 2 to 5 microns, as measured by mercury porosimetry. The diameter of the aluminum discs used varied between 6.35 cm to 8.9 cm, with a thickness of 0.0137 cm.

To form the LCM composition, 3.6 grams of the gamma cyclodextrin and 7.5 grams of the aminopropyl terminated polydimethylsiloxane from Example 1 were first added to an aqueous solution of 63.9 grams water and mixed. During the addition of each of the previous, mixing occurred using a high-speed mixer (15,000 rpm) at 25° C. An aqueous-based drilling fluid, according to embodiments herein, was then formed by adding varying amounts of the LCM composition, as well as constant amounts of two weighting agents/thickening agents, barite and bentonite, as well as a thickener, xanthan gum. As for the LCM composition, five to ten minutes of mixing using the same high-speed mixer occurred at the same conditions after the addition of each component. The three aqueous-based drilling fluids ultimately formed are illustrated below in Table 3. The aqueous-based drilling fluids each had a mud density of 10 pounds per gallon.

TABLE 3

Filtration Loss Totals and Fluid Compositions

| Component | Comparative Example 1 | Inventive Example 1 | Inventive Example 2 |
|---|---|---|---|
| Water, g | 326 | 301 | 276 |
| LCM Composition, g | 0 | 25 | 50 |
| Bentonite, g | 4 | 4 | 4 |
| Xanthan gum, g | 0.5 | 0.5 | 0.5 |
| Barite, g | 88 | 88 | 88 |
| Filtration Loss (mL) | 16.4 | 14.0 | 12.6 |

As shown above in Table 3, Inventive Examples 1 and 2 contained approximately 6.0 wt.% and approximately 12 wt.% LCM composition by weight of the aqueous-based drilling fluid. Comparative Example 1 contained no LCM composition. These three fluids were then loaded into the filter press at 25° C. and at a differential pressure of 100 psi. The results of the filtration test are also shown above in Table 3. As shown in Table 3, inclusion of the LCM composition resulted in decreased fluid loss across the filter, indicating the host-guest rod structures conforming to and plugging the 2 to 5 micron pore throats of the paper filter. Increasing amounts of the LCM composition also resulted in further decreases in fluid loss, indicating the LCM composition continues to form a tighter pack in the pore throats of the paper filter as the host-guest structures slide and conform to the pore throats.

It is noted that recitations in the present disclosure of a component of the present disclosure being "operable" or "sufficient" in a particular way, to embody a particular property, or to function in a particular manner, are structural recitations, as opposed to recitations of intended use. More specifically, the references in the present disclosure to the manner in which a component is "operable" or "sufficient" denotes an existing physical condition of the component and, as such, is to be taken as a definite recitation of the structural characteristics of the component.

It is also noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

Having described the subject matter of the present disclosure in detail and by reference to specific embodiments, it is noted that the various details disclosed in the present disclosure should not be taken to imply that these details relate to elements that are essential components of the various embodiments described in the present disclosure. Further, it will be apparent that modifications and variations are possible without departing from the scope of the present disclosure, including, but not limited to, embodiments defined in the appended claims.

The singular forms "a", "an" and "the" include plural referents, unless the context clearly dictates otherwise.

Throughout this disclosure ranges are provided. It is envisioned that each discrete value encompassed by the ranges are also included. Additionally, the ranges which may be formed by each discrete value encompassed by the explicitly disclosed ranges are equally envisioned.

As used herein and in the appended claims, the words "comprise," "has," and "include" and all grammatical variations thereof are each intended to have an open, non-limiting meaning that does not exclude additional elements or steps.

As used herein, terms such as "first" and "second" are arbitrarily assigned and are merely intended to differentiate between two or more instances or components. It is to be understood that the words "first" and "second" serve no other purpose and are not part of the name or description of the component, nor do they necessarily define a relative location, position, or order of the component. Furthermore, it is to be understood that the mere use of the term "first" and "second" does not require that there be any "third" component, although that possibility is contemplated under the scope of the present disclosure.

What is claimed is:

1. A host-guest lost circulation material (LCM) composition for sealing lost circulation zones in wellbores, the LCM composition comprising:
    an aqueous solution;
    one or more linear polymer chains, the linear polymer chains comprising polyethylene glycols (PEG) with molecular weights greater than 2500 g/mol, polypropylene glycols (PPG), polydimethylsiloxanes (PDMS), or combinations thereof; and
    one or more cyclic molecules comprising alpha cyclodextrin, beta cyclodextrin, gamma cyclodextrin, or combinations thereof, and wherein
    the one or more cyclic molecules form a host-guest structure around the one or more linear polymer chains utilizing van der Waals forces, wherein the LCM composition does not comprise cement.

2. The LCM composition of claim 1, wherein the ratio of the one or more cyclic molecules to the one or more linear polymer chains is from 5:1 to 879:1 cyclic molecules to linear polymer chain.

3. The LCM composition of claim 1, wherein the host-guest structure self-assembles into a rod-like structure, the one or more linear polymer chains threading through the center of the one or more cyclic molecules.

4. The LCM composition of claim 1, wherein the linear polymer chains comprise the polyethylene glycols, the polyethylene glycols having have a structure comprising Formula (I):

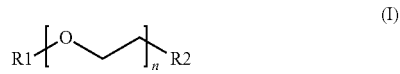

(I)

wherein R1 and R2 are reactive end groups comprising amines, carboxylates, hydroxyls, thiols, esters, azides, epoxides, nitro groups, or combinations thereof, and n is an integer from 10 to 1000.

5. The LCM composition of claim 4, wherein
    the one or more linear polymer chains are PEG with n equal to 567;
    the one or more cyclic molecules are alpha cyclodextrin; and the alpha cyclodextrin forms a host-guest structure around the polyethylene glycol utilizing van der Waals forces.

6. The LCM composition of claim 1, wherein the linear polymer chains comprise the polypropylene glycols, the polypropylene glycols having a structure comprising Formula (II):

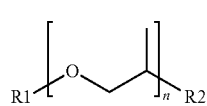

wherein R1 and R2 are reactive end groups comprising amines, carboxylates, hydroxyls, thiols, esters, azides, epoxides, nitro groups, or combinations thereof, and n is an integer from 10 to 1000.

7. The LCM composition of claim 6, wherein the one or more linear polymer chains are PPG with n equal to 430;

the one or more cyclic molecules are beta cyclodextrin; and the beta cyclodextrin forms a host-guest structure around the PDMS utilizing van der Waals forces.

8. The LCM composition of claim 1, wherein the linear polymer chains comprise the polydimethylsiloxanes, the polydimethylsiloxanes having a structure comprising Formula (III):

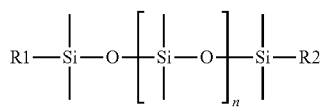

wherein R1 and R2 are reactive end groups comprising amines, carboxylates, hydroxyls, thiols, esters, azides, epoxides, nitro groups, or combinations thereof, and n is an integer from 10 to 1000.

9. The LCM composition of claim 8, wherein the one or more linear polymer chains are PDMS with n equal to 335;

the one or more cyclic molecules are gamma cyclodextrin; and the gamma cyclodextrin forms a host-guest structure around the PDMS utilizing van der Waals forces.

10. The LCM composition of claim 1, wherein the linear polymer chains comprise the polyethylene glycols;

the molecular weight of the polyethylene glycols is from 2,000 g/mol to 50,000 g/mol; and the length of the polyethylene glycols is from approximately 13 nm to approximately 350 nm.

11. The LCM composition of claim 1, wherein the linear polymer chains comprise the polypropylene glycols;

the molecular weight of the polypropylene glycols is from 1000 g/mol to 50,000 g/mol; and the length of the polypropylene glycols is from approximately 5 nm to approximately 260 nm.

12. The LCM composition of claim 1, wherein the linear polymer chains comprise the polydimethylsiloxanes;

the molecular weight of the polydimethylsiloxanes is from 1000 g/mol to 50,000 g/mol; and the length of the polydimethylsiloxanes is from approximately 2 nm to approximately 100 nm.

13. The LCM composition of claim 1, wherein the alpha, beta, and gamma cyclodextrins have chemical structures of $C_{36}H_{60}O_{30}$, $C_{42}H_{70}O_{35}$, and $C_{49}H_{80}O_{40}$, respectively.

14. The LCM composition of claim 1, wherein one or more linear polymer chains and the one or more cyclic molecules together are from 1 wt.% to 25 wt.% of the LCM composition.

15. An aqueous-based drilling fluid, comprising:

the LCM composition of claim 1;

a weighting agent comprising barite, bentonite, calcium carbonate, hematite, or combinations thereof; and a viscosifier comprising xanthan gum, guar, glycol, carboxymethylcellulose, polyanionic cellulose, or combinations thereof.

16. A method of making a host-guest lost circulation material (LCM) composition for sealing lost circulation zones in wellbores, the method comprising:

adding one or more cyclic molecules to an aqueous solution, the cyclic molecules comprising alpha cyclodextrins, beta cyclodextrins, gamma cyclodextrins, or combinations thereof;

adding one or more linear polymer chains to the aqueous solution, the linear polymer chains comprising polyethylene glycols (PEG) with molecular weights greater than 2500 g/mol, polypropylene glycols (PPG), polydimethylsiloxanes (PDMS), or combinations thereof; and agitating the aqueous solution until the aqueous solution is observed to turn opaque, wherein the one or more cyclic molecules form a host-guest structure around the one or more linear polymer chains utilizing van der Waals forces, and wherein the LCM composition does not comprise cement.

17. The method of claim 16, wherein the LCM composition further comprises:

a weighting agent comprising barite, bentonite, calcium carbonate, hematite, or combinations thereof; and a viscosifier comprising xanthan gum, guar, glycol, carboxymethylcellulose, polyanionic cellulose, or combinations thereof.

18. A method of treating a lost circulation zone of a wellbore, the method comprising:

injecting a host-guest lost circulation material (LCM) composition into the lost circulation zone, the LCM composition comprising:

an aqueous solution;

one or more linear polymer chains, the linear polymer chains comprising polydimethylsiloxanes (PDMS), polypropylene glycols (PPG), polyethylene glycols (PEG) with molecular weights greater than 2500 g/mol, or combinations thereof; and one or more cyclic molecules comprising alpha, beta, or gamma cyclodextrins; and wherein the one or more cyclic molecules form a host-guest structure around the one or more linear polymer chains utilizing van der Waals forces; and allowing the LCM composition to plug the lost circulation zone, thereby preventing wellbore fluids from passing into the lost circulation zone, wherein the LCM composition does not comprise cement.

19. The method of claim 18, wherein the LCM composition reduces fluid loss to the lost circulation zone by from 1 mL per 31.65 to 62.21 cm$^2$ to 45 mL per 31.65 to 62.21 cm$^2$.

20. The method of claim 18, further comprising introducing a displacement fluid after the LCM composition to displace the LCM composition into the lost circulation zone.

* * * * *